(12) United States Patent
Grbovic

(10) Patent No.: US 7,336,052 B2
(45) Date of Patent: Feb. 26, 2008

(54) DEVICE FOR POWERING A VARIABLE SPEED DRIVE

(75) Inventor: Petar Grbovic, Pacy sur Eure (FR)

(73) Assignee: Schneider Toshiba Inverter Europe SAS, Pacy-sur-Eure (FR)

( * ) Notice: Subject to any disclaimer, the term of this patent is extended or adjusted under 35 U.S.C. 154(b) by 43 days.

(21) Appl. No.: 11/425,246

(22) Filed: Jun. 20, 2006

(65) Prior Publication Data

US 2007/0013332 A1    Jan. 18, 2007

(30) Foreign Application Priority Data

Jul. 18, 2005   (FR) .................................. 05 52221

(51) Int. Cl.
*H02P 27/06* (2006.01)
*H02M 7/48* (2007.01)

(52) U.S. Cl. ............... 318/800; 318/801; 318/439; 318/254; 363/34; 363/35; 363/37; 363/40

(58) Field of Classification Search ............... None
See application file for complete search history.

(56) References Cited

U.S. PATENT DOCUMENTS

| 4,314,194 | A | * | 2/1982 | Severing | ............... | 322/89 |
| 4,761,726 | A | * | 8/1988 | Brown | ............... | 363/51 |
| 4,823,065 | A | * | 4/1989 | Gousset | ............... | 318/798 |
| 4,894,762 | A | * | 1/1990 | Steinshorn | ............... | 363/35 |
| 5,793,622 | A | * | 8/1998 | Dahler et al. | ............... | 363/34 |
| 6,958,923 | B2 | * | 10/2005 | Nuutinen | ............... | 363/54 |
| 7,149,902 | B2 | * | 12/2006 | Ryu | ............... | 713/300 |
| 7,227,330 | B2 | * | 6/2007 | Swamy et al. | ............... | 318/798 |
| 7,250,794 | B2 | * | 7/2007 | Franke et al. | ............... | 327/111 |
| 2003/0110405 | A1 | * | 6/2003 | Ryu | ............... | 713/320 |
| 2003/0198065 | A1 | * | 10/2003 | Hayashi et al. | ............... | 363/35 |
| 2005/0041443 | A1 | | 2/2005 | Franke et al. | | |

FOREIGN PATENT DOCUMENTS

DE    100 01 497 A1    7/2002
EP    0 313 366 A2    4/1989

* cited by examiner

*Primary Examiner*—Lincoln Donovan
*Assistant Examiner*—Eduardo Colon Santana
(74) *Attorney, Agent, or Firm*—Oblon, Spivak, McClelland, Maier & Neustadt, P.C.

(57) ABSTRACT

Variable speed drive comprising a main rectifier module (10) including thyristors (K1, K2, K3) to power a main continuous bus (15) from an external power network (5), an inverter module (30) delivering a variable control voltage to an electric motor from the main bus (15), an auxiliary rectifier module (20) connected to the external power network (5), an electronic control unit (50) controlling the thyristors, a powering module (29) supplying the control unit (50) from the auxiliary rectifier module (20) and from the main rectifier module (10). According to the invention, a switching device (40) controlled by the control unit (50) is used to disconnect the powering module (29) and the auxiliary rectifier module (20).

11 Claims, 2 Drawing Sheets

DEVICE FOR POWERING A VARIABLE SPEED DRIVE

BACKGROUND OF THE INVENTION

The present invention relates to an inverter type variable speed drive intended to monitor/control an electric motor. More specifically, the invention relates to a device for powering a control unit of a variable speed drive and to a method for powering up a variable speed drive.

In a known manner, inverter type variable speed drives include a main rectifier bridge or module, the purpose of which is to rectify a voltage from an external AC electrical power source (for example, a 380 Vac three-phase electrical power network) in order to deliver a DC voltage to a main continuous bus (for example in the order of 400 to 800 Vcc according to the conditions of use of the motor). Variable speed drives hence comprise an inverter module, the purpose of which is, from this main bus, to control a three-phase electric motor with a voltage of variable amplitude and frequency. To this end, the main rectifier module and the inverter module are equipped with power electronic semiconductor components, for example consisting of one diode and one thyristor per phase for the rectifier module and consisting of two power transistors and two diodes per phase for the inverter module.

An electronic control unit is in particular tasked with controlling the thyristors of the main rectifier module and the transistors of the inverter module. This control unit is usually powered by a switch mode power supply (or SMPS) of the variable speed drive.

The switch mode power supply is generally powered from the main bus voltage. Nevertheless, at the moment the variable drive is powered up, the main bus is not yet charged and therefore does not supply current. Hence the switch mode power supply cannot power the control unit, which is therefore incapable of controlling the thyristors of the main rectifier module, thus preventing the main bus from becoming charged. It is therefore necessary to provide an additional power source for the switch mode power supply when the variable drive is being powered up, before the main bus is charged.

This additional source may come from an auxiliary rectifier module comprising one rectifying diode per phase and connected between the three-phase external source and the switch mode power supply. This additional power source hence supplies an auxiliary continuous bus connected to the switch mode power supply, enabling the latter to power the control unit as soon as the variable drive is powered up so as to be able to control the thyristors of the main rectifier module in order to thus charge the main continuous bus.

However, with this type of power circuit, a loop can then arise between the main bus, the auxiliary bus and a possible earth-return circuit via the external power network, especially in the event of a slight leakage to earth from the variable drive (not detected by a protection circuit) or if long screened motor cables are used (in particular if the motor to be controlled is remote from the variable drive or if the variable drive controls several motors in parallel). In that case, when the main bus voltage is high, for example during motor braking phases, there is then a risk of a very significant overvoltage on the auxiliary bus leading to a danger of destruction or damage of the switch mode power supply and/or of the auxiliary bus capacitance.

To prevent this phenomenon, one solution involves using two separate switch mode power supplies. A first power supply is connected to the main bus and powers a control unit tasked with controlling the power transistors of the inverter module. A second auxiliary power supply is connected to the auxiliary bus and powers a control unit tasked with controlling the power thyristors of the main rectifier module, at least during a startup phase. Nevertheless, this solution turns out to be expensive and cumbersome.

Another solution involves using only rectifier diodes and resistances in the main rectifier module, without needing power thyristors and therefore without needing the control unit for charging the main bus. Nevertheless, this solution can be considered only for small variable drives since it requires the use of high power resistances and a bulky contactor. Furthermore, it does not enable the charging of the main bus to be started up gradually and in a regulated manner.

SUMMARY OF THE INVENTION

This is why the invention intends to overcome these drawbacks by presenting a solution in which a switch mode power supply is used to power the control unit of a variable speed drive as soon as the variable drive is powered up while avoiding the abovementioned overvoltage risks.

To this end, the invention describes a variable speed drive for an electric motor, comprising a main rectifier module comprising power thyristors to power a main continuous bus from an external power network, an inverter module delivering a variable control voltage to the motor from the main bus, an auxiliary rectifier module connected to the external power network, an electronic control unit controlling the power thyristors, a powering module supplying the control unit from the auxiliary rectifier module and from the main rectifier module. The variable speed drive comprises a switching device controlled by the control unit and connected between the powering module and the auxiliary rectifier module.

According to one feature, a first resistance is connected between the powering module and the auxiliary rectifier module, and a second resistance, lower in value than the first resistance, is connected between the powering module and the main bus.

According to another feature, the switching device comprises a relay having a control coil controlled by the control unit and a break contact connected between the powering module and the auxiliary rectifier module.

The invention also describes a method for powering up the variable drive comprising a first step in which the powering module is powered by the auxiliary rectifier module, a second step in which the control unit controls the power thyristors in order to charge the main continuous bus, and a third step in which the control unit opens the switching device placed between the powering module and the auxiliary rectifier module.

BRIEF DESCRIPTION OF THE DRAWINGS

Other features and advantages will become apparent in the following detailed description referring to an embodiment given by way of example and represented by the accompanying drawings in which.

DETAILED DESCRIPTION

Figure 1:
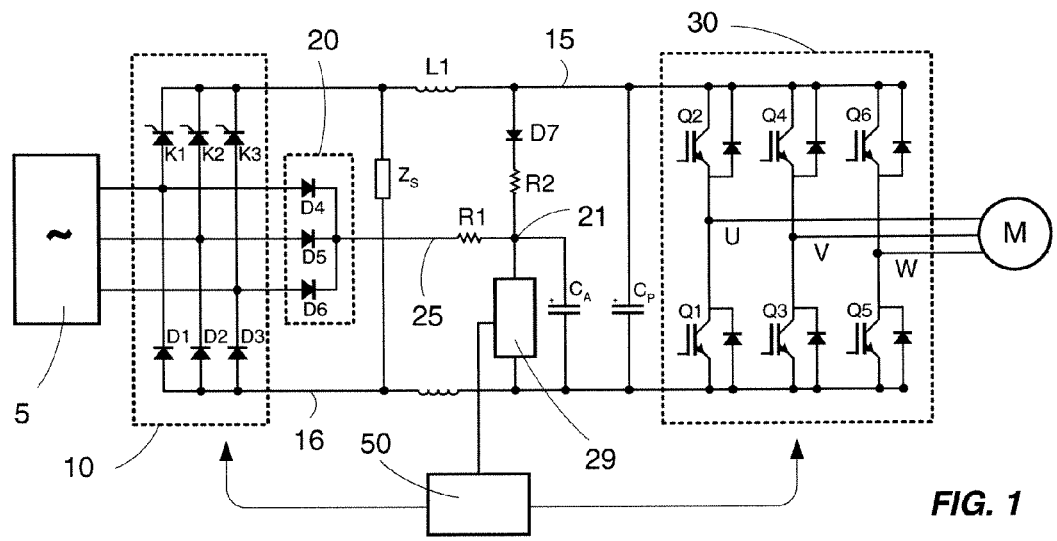
FIG. 1 represents a simplified circuit diagram of an inverter type variable speed drive, using a main rectifier module and an auxiliary rectifier module connected to a switch mode power supply module, FIG. 2 schematically represents an earth-return in such a variable frequency drive.

With reference to FIG. 1, an inverter type variable speed drive is tasked with controlling and regulating the speed of a three-phase electric motor M, for example an asynchronous motor. Such a variable drive is powered by an external power source 5, such as a three-phase electrical power network. The variable drive usually comprises a main rectifier module 10 comprising power electronic semi-conductor components such as a diode D1, D2, D3 and a power thyristor K1, K2, K3 for each phase of the electrical power network so as to charge a main continuous bus 15.

The variable drive also comprises an inverter module 30 including power electronic semi-conductor components to control the motor M with a control voltage of variable frequency and amplitude. The inverter module 30 is powered by the main bus 15 and comprises two power transistors Q1-Q2, Q3-Q4, Q5-Q6 for each phase U, V, W of the power for the motor M.

Usually, with a three-phase external power network in the order of 380 to 460 Vac, the value of the voltage of the main bus 15 can vary between about 400 and 800 Vcc according to how the motor operates. Indeed, the voltage of the main bus 15 can increase up to about 800 Vcc in the motor braking phases, but this voltage value nevertheless always remains regulated by the variable drive.

The semi-conductor power components of the main rectifier module 10 and of the inverter module 30 are controlled by a control unit 50. This control unit may be made up equally of one or more separate entities to control the main rectifier module 10 on the one hand and the inverter module 30 on the other hand. The control unit is powered by a powering module 29 of the variable drive, preferably of the switch mode power supply type. This powering module 29 is usually powered by the main bus 15 and delivers the low DC voltage or voltages (for example 5 V, 12 V and/or 24 Vcc) required in particular for the operation of the control unit or control units of the variable drive.

Nevertheless, at the moment the variable drive is powered up, the main bus 15 is not yet charged and therefore is incapable of supplying current. Hence, the powering module 29 cannot power the control unit 50, which is also incapable of controlling the thyristors K1, K2, K3 of the main rectifier module 10, thus preventing the main bus 15 from becoming charged. It is therefore necessary to provide an additional power source for the powering module 29 when the variable drive is being powered up, before the main bus 15 is charged and stabilized.

This is why the variable drive comprises an auxiliary rectifier module 20 connected to the external electrical power network 5 and including a diode D4, D5, D6 for each phase of the electrical power network so as to charge an auxiliary continuous bus 25. This auxiliary bus 25 is connected to the powering module 29 via a first resistance R1. By virtue of this auxiliary rectifier module 20, the control unit 50 can be powered as soon as the variable drive is powered up so as to be capable of controlling the power thyristors K1, K2, K3 of the main rectifier module 10 in order to charge the main bus.

The powering module 29 is connected to the main bus 15 via a second resistance R2 in series with a diode D7, the cathode of which faces the side of the powering module 29. The value of the second resistance R2 is lower than the value of the first resistance R1. Thus, when the voltage of the main bus 15 is available, the powering module 29 is mainly powered by the main bus 15 rather than by the auxiliary bus 25, given the ratio between the values of the resistances R1 and R2.

Preferably, the value of the first resistance R1 is sufficiently high (for example in the order of 100 ohms) so as to limit the charge current for the auxiliary bus 25 upon power-up. This requirement implies that it is not desirable for the powering module 29 to be constantly powered only by the auxiliary bus 25 since the high value of R1 would result in high consumption levels. This is why the second resistance R2 is of a lower value (for example in the order of 10 ohms) so as to favour the supply of power to the module 29 by the main bus 15, after the latter is charged.

Between the positive line 15 and the negative line 16 of the main bus, there is a snubber circuit represented in the figures in a simplified manner by a snubber impedance $Z_S$. This snubber circuit is either an RC circuit with a resistance and a capacitance, or preferably an RCD circuit with a resistance and a capacitance in series with a diode and a resistance in parallel with the diode. In addition, there is a line inductance L1 indicated on the lines 15, 16 of the main bus. Furthermore, between the positive line 15 and the negative line 16 of the main bus, there is a main bus capacitance $C_P$, and between the positive line 25 and the negative line 16 of the auxiliary bus, there is an auxiliary bus capacitance $C_A$. These bus capacitances are generally electrolytic and impose a gradual charging-up of the buses and therefore limit the bus charging currents.

According to the variant of FIG. 1, the second resistance R2 is connected between a connection node 21 directly connected to the powering module 29 and the main bus 15, and the first resistance R1 is connected between the connection node 21 and the auxiliary bus 25. According to an equivalent variant, the second resistance R2 may be placed between the connection node 21 and the powering module 29. In that case, the value of the resistance between the powering module 29 and the auxiliary bus 25 would be equal to R1+R2, and the value of the resistance between the powering module 29 and the main bus 15 would be equal to R2 only, thus remaining lower than R1+R2.

Figure 2:
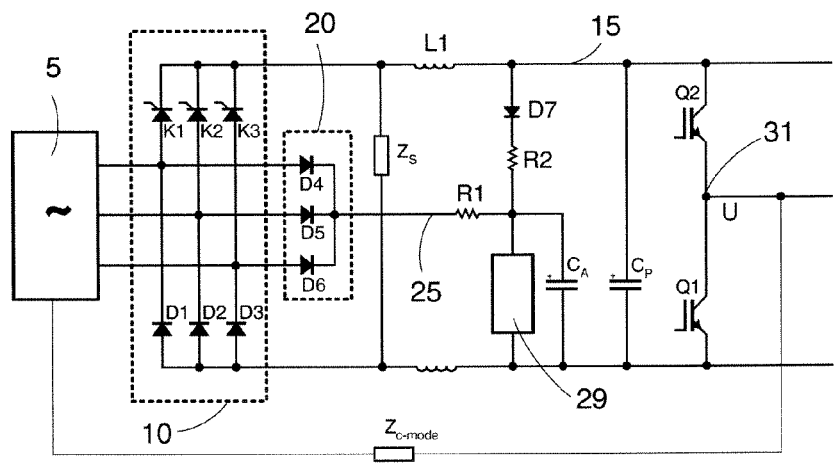

FIG. 2 shows the variable drive of FIG. 1, in which variable drive there features an earth connection through a common mode impedance $Z_{c\text{-}mode}$ between one of the phases of the motor M, in this case phase U, and the external power network 5. Such a scenario may arise when there is a minor earth fault (minor short-circuit between one phase of the motor and earth) with an impedance $Z_{c\text{-}mode}$ that is sufficiently high such that the usual devices protecting against this type of fault are not triggered. Such a scenario may also arise without an earth fault but when very long screened motor cables are used, i.e. if the motor is remote from the variable drive or if several small motors are controlled in parallel using the same variable drive.

Figure 3:
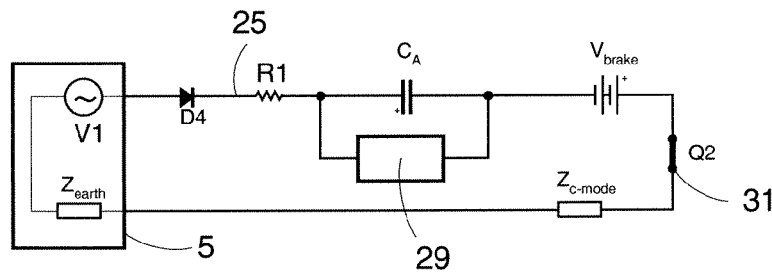
FIGS. 3 and 4 show equivalent circuit diagrams of a first and a second current loop path in the event of a fault.
Figure 4:
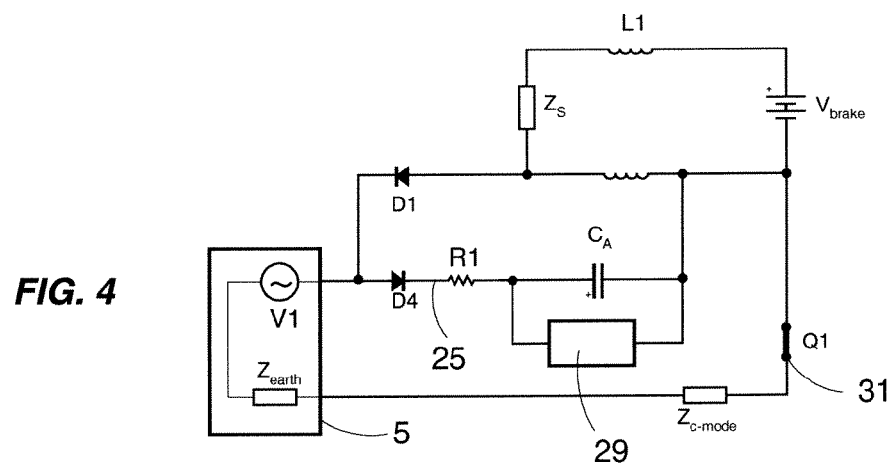

When such an earth connection exists, the powering principle proposed may then lead to loops, the equivalent circuit diagrams of which are indicated in FIGS. 3 and 4 according to the conducting power transistor, Q2 or Q1 respectively, assuming an earth connection through phase U of the motor.

In FIGS. 3 and 4, the variable drive is in motor braking phase, bringing about a significant voltage on the main bus 15, indicated by $V_{brake}$. The first loop path of FIG. 3 is a direct path passing through the external power network 5 supplying a positive phase-to-earth AC voltage V1, one of the diodes D4, D5 or D6 of the auxiliary rectifier module 20, the first resistance R1, the powering module 29 and the auxiliary bus capacitance $C_A$, the generator of voltage $V_{brake}$ on the main bus, the transistor Q2 of the inverter module 30 and a loop through earth via the impedance $Z_{c\text{-}mode}$ and the earth impedance $Z_{earth}$ of the power network 5. In this first loop path, the earth current flows directly through the auxiliary bus 25 and charges the auxiliary bus capacitance $C_A$. The earth impedance $Z_{earth}$ of the power network 5 depends in particular on the topology of the electrical power network (TT, TN or IT).

The second loop path of FIG. 4 is an indirect path which arises when the AC voltage V1 is negative and when the transistor Q1 is conducting. In that case, the earth current does not flow directly through the auxiliary bus 25 and the auxiliary bus capacitance $C_A$. But, during the transition between Q1 and Q2 or in the event of a variation in the earth current, the return of current from one of the diodes D1, D2 or D3 can also charge the auxiliary bus 25.

The charging effect depends on the switching frequency of Q1 and Q2, on the value of the voltage V1 and on the value of the total earth impedance: $Z_{c\text{-}mode}+Z_{earth}$. When the voltage of the main bus 15 is high, for example $V_{brake}$=800 V, and when the first resistance R1 is in the order of 100 ohms, then the voltage on the auxiliary bus 25 can reach values of up to 1400 Vcc since this voltage is not regulated like that of the main bus 15. Such a voltage can then seriously damage the powering module 29 and the auxiliary bus capacitance $C_A$.

Figure 6:
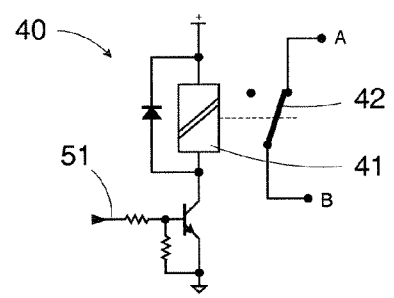
Figure 5:
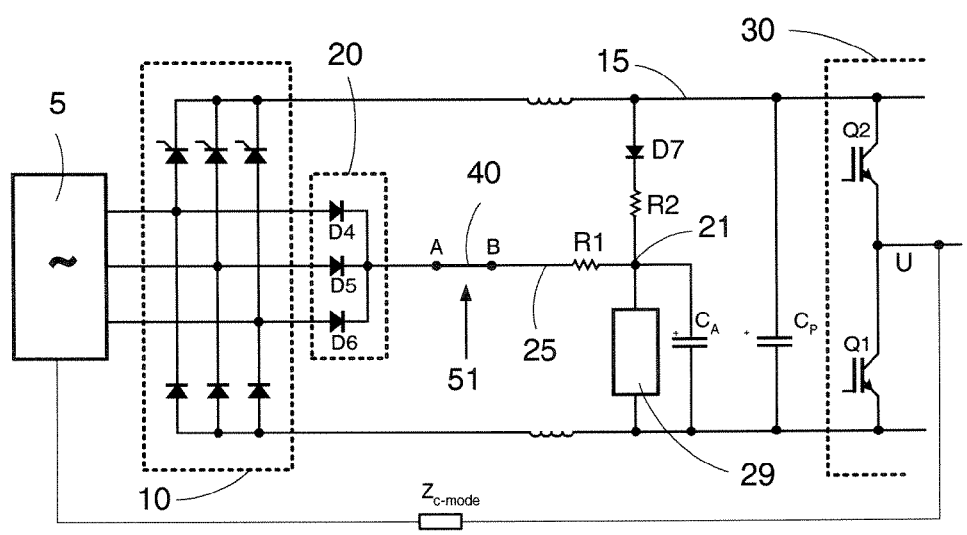
FIG. 5 shows the variable speed drive of FIG. 1 with a switching device in accordance with the invention, FIG. 6 details one embodiment of the switching device.

This is why the invention provides a switching device 40 indicated in FIG. 5 advantageously enabling the powering module 29 to be isolated from the auxiliary rectifier circuit 20, preventing loops such as those indicated in FIGS. 3 and 4. This switching device 40 is controlled by the control unit 50 via an order 51. Preferably, it comprises a control coil 41 acting on a break contact 42, i.e. normally closed, as detailed in FIG. 6. When the order 51 is not activated, the contact 42 is conducting and the powering module 29 is connected to the auxiliary rectifier module 20. When the order 51 is activated, the contact 42 is opened, isolating the powering module 29 from the auxiliary rectifier module 20.

The order 51 is activated by the control unit 50 when for example the latter detects, using suitable measurement means, that the voltage of the main bus 15 is greater than or equal to a predetermined threshold, which is sufficient for the main bus 15 to be capable of supplying the powering module 29.

Hence, the method for powering up the variable drive is as follows:

During a first step, at the moment the variable drive is powered up, the external power network 5 delivers a voltage which enables the auxiliary rectifier module 20 to rapidly supply the powering module 29 via the first resistance R1, since the switching device 40 is normally closed and therefore conducting when there is no voltage on the order 51. This step is for powering up the control unit 50.

In a second step, when the control unit 50 is powered, it controls the power thyristors K1, K2, K3 of the main rectifier module 10 so as to be able to charge the main continuous bus 15 from the voltage of the external power network 5. During this step, when the main bus 15 becomes operational, the powering module 29 will then be powered mainly by the main bus 15 via the second resistance R2, given that R2 is higher than R1.

In a third step, the control unit 50 opens the switching device 40 placed between the powering module 29 and the auxiliary rectifier module 20 so as to isolate the powering module 29 from the auxiliary rectifier module 20 and thus prevent the possible parasitic loop circuits indicated in FIGS. 3 and 4. To this end, the control unit 50 sends an order 51, for example following the crossing of a voltage threshold for the main bus 15 or more simply following the passing of a delay period.

Clearly it is possible, without departing from the context of the invention, to imagine other variants and minor improvements, and likewise envisage the use of equivalent means.

The invention claimed is:

1. A variable speed drive for an electric motor, comprising:
    a main rectifier module including power thyristors to power a main continuous bus from an external power network,
    an inverter module delivering a variable control voltage to the motor from the main bus,
    an auxiliary rectifier module connected to the external power network,
    an electronic control unit controlling the power thyristors,
    a powering module supplying the control unit from the auxiliary rectifier module and from the main rectifier module,
    wherein the variable speed drive comprises a switching device controlled by the control unit and connected between the powering module and the auxiliary rectifier module.

2. The variable speed drive according to claim 1, wherein the switching device comprises a relay having a control coil controlled by the control unit and a break contact connected between the powering module and the auxiliary rectifier module.

3. The variable speed drive according to claim 1, wherein the control unit comprises means for measuring the voltage of the main bus and orders the opening of the switching device when the voltage of the main bus is higher than a predetermined threshold.

4. The variable speed drive according to claim 1, wherein a first resistance is connected between the powering module and the auxiliary rectifier module (20), and a second resistance, lower in value than the first resistance, is connected between the powering module and the main bus.

5. The variable speed drive according to claim 4, wherein a diode is connected in series with the second resistance between the powering module and the main bus.

6. The variable speed drive according to claim 1, wherein the auxiliary rectifier module comprises a diode for each phase of the external power network.

7. The variable speed drive according to claim 1, wherein the main rectifier module comprises a diode and a power thyristor for each phase of the external power network.

8. The variable speed drive according to claim 1, wherein, for each powering phase for the motor, the inverter module comprises two power transistors controlled by the control unit.

9. The variable speed drive according to claim 1, wherein the powering module is a switch mode power supply module.

10. A method for powering up a variable speed drive which comprises:
    a main rectifier module including power thyristors to power a main continuous bus from an external power network,
    an inverter module delivering a variable control voltage to an electric motor from the main bus,
    an auxiliary rectifier module connected to the external power network, an electronic control unit controlling the power thyristors and powered by a powering module from the auxiliary rectifier module and from the main rectifier module, wherein the method comprises:

a first step in which the powering module is powered by the auxiliary rectifier module, a second step in which the control unit controls the power thyristors in order to charge the main continuous bus, a third step in which the control unit opens a switching device placed between the powering module and the auxiliary rectifier module.

11. The powering-up method according to claim 10, wherein the control unit opens the switching device when the voltage of the main bus is higher than a predetermined threshold.

* * * * *